United States Patent
Sunaga

(10) Patent No.: US 8,842,380 B2
(45) Date of Patent: Sep. 23, 2014

(54) IMAGING LENS AND IMAGING APPARATUS

(75) Inventor: Toshihiro Sunaga, Kanagawa (JP)

(73) Assignee: Sony Corporation, Tokyo (JP)

(*) Notice: Subject to any disclaimer, the term of this patent is extended or adjusted under 35 U.S.C. 154(b) by 115 days.

(21) Appl. No.: 13/482,625

(22) Filed: May 29, 2012

(65) Prior Publication Data

US 2012/0314306 A1    Dec. 13, 2012

(30) Foreign Application Priority Data

Jun. 7, 2011  (JP) .................. 2011-127602

(51) Int. Cl.
*G02B 9/12* (2006.01)
*G02B 9/34* (2006.01)
*G02B 13/04* (2006.01)
*G03B 17/46* (2006.01)
*G03B 17/14* (2006.01)

(52) U.S. Cl.
CPC ............... *G03B 17/46* (2013.01); *G02B 13/04* (2013.01); *G03B 17/14* (2013.01)
USPC .......................................... 359/784; 359/781

(58) Field of Classification Search
USPC .................................. 359/781, 782, 784, 791
See application file for complete search history.

(56) References Cited

U.S. PATENT DOCUMENTS

2012/0314305 A1*  12/2012  Miyagawa ................... 359/784

FOREIGN PATENT DOCUMENTS

| JP | 06-337348 | 12/1994 |
| JP | 2009-058651 | 3/2009 |
| JP | 2009-210910 | 9/2009 |

* cited by examiner

*Primary Examiner* — William Choi
(74) *Attorney, Agent, or Firm* — Rader, Fishman & Grauer PLLC

(57) ABSTRACT

An imaging lens includes: a first lens group; a second lens group having positive refractive power; and a third lens group having negative refractive power, which are arranged in order from an object side, wherein the first lens group includes a former lens group having a negative lens in a most object side, a diaphragm, and a rear lens group, and wherein, when focusing is performed, the second lens group is moved in the optical axis direction.

10 Claims, 9 Drawing Sheets

EMBODIMENT 1

EMBODIMENT 1

EMBODIMENT 2

EMBODIMENT 3

EMBODIMENT 4

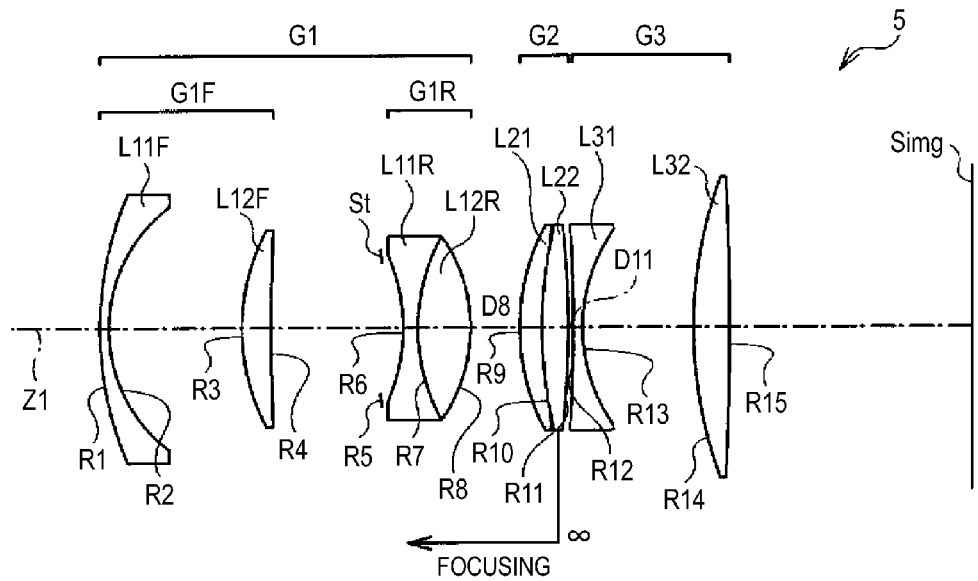
FIG.5
EMBODIMENT 5
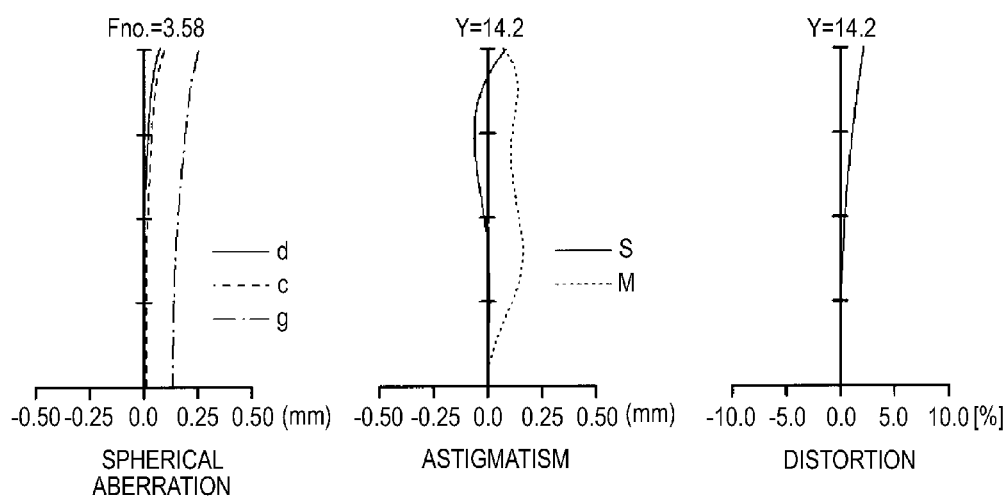
EMBODIMENT 1 · INFINITE FOCUSING
FIG.6A — SPHERICAL ABERRATION
FIG.6B — ASTIGMATISM
FIG.6C — DISTORTION

EMBODIMENT 1 · FOCUSING AT CLOSE RANGE

SPHERICAL ABERRATION

ASTIGMATISM

DISTORTION

EMBODIMENT 2 · INFINITE FOCUSING

SPHERICAL ABERRATION

ASTIGMATISM

DISTORTION

EMBODIMENT 2 · FOCUSING AT CLOSE RANGE

Fno.=3.72
SPHERICAL ABERRATION

Y=14.2
ASTIGMATISM

Y=14.2
DISTORTION

EMBODIMENT 3 · INFINITE FOCUSING

Fno.=3.58
SPHERICAL ABERRATION

Y=14.2
ASTIGMATISM

Y=14.2
DISTORTION

EMBODIMENT 3 · FOCUSING AT CLOSE RANGE

Fno.=3.72
— d
--- c
—·— g
-0.50 -0.25 0.0 0.25 0.50 (mm)
SPHERICAL ABERRATION

Y=14.2
— S
····· M
-0.50 -0.25 0.0 0.25 0.50 (mm)
ASTIGMATISM

Y=14.2
-10.0 -5.0 0.0 5.0 10.0 [%]
DISTORTION

EMBODIMENT 4 · INFINITE FOCUSING

Fno.=3.59
— d
--- c
—·— g
-0.50 -0.25 0.0 0.25 0.50 (mm)
SPHERICAL ABERRATION

Y=14.2
— S
····· M
-0.50 -0.25 0.0 0.25 0.50 (mm)
ASTIGMATISM

Y=14.2
-10.0 -5.0 0.0 5.0 10.0 [%]
DISTORTION

EMBODIMENT 4 · FOCUSING AT CLOSE RANGE

Fno.=3.75

-0.50 -0.25 0.0 0.25 0.50 (mm)
SPHERICAL ABERRATION

— d
---- c
—·— g

Y=14.2

-0.50 -0.25 0.0 0.25 0.50 (mm)
ASTIGMATISM

— S
----- M

Y=14.2

-10.0 -5.0 0.0 5.0 10.0
[%]
DISTORTION

EMBODIMENT 5 · INFINITE FOCUSING

Fno.=2.89

-0.50 -0.25 0.0 0.25 0.50 (mm)
SPHERICAL ABERRATION

— d
---- c
····· g

Y=14.2

-0.50 -0.25 0.0 0.25 0.50 (mm)
ASTIGMATISM

— S
----- M

Y=14.2

-10.0 -5.0 0.0 5.0 10.0
[%]
DISTORTION

EMBODIMENT 5 · FOCUSING AT CLOSE RANGE
FIG.15A
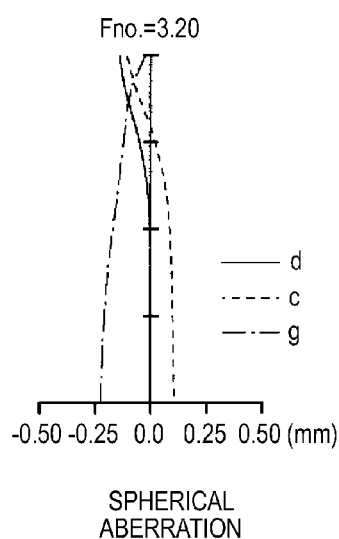
Fno.=3.20
— d
---- c
—·— g
-0.50 -0.25 0.0 0.25 0.50 (mm)
SPHERICAL
ABERRATION
FIG.15B
Y=14.2
— S
----- M
-0.50 -0.25 0.0 0.25 0.50 (mm)
ASTIGMATISM
FIG.15C
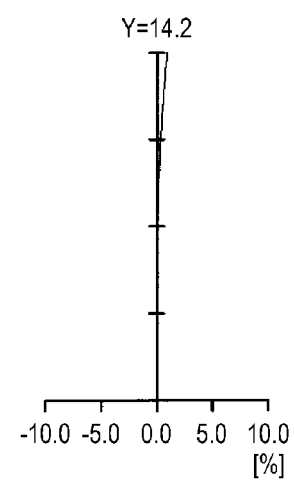
Y=14.2
-10.0 -5.0 0.0 5.0 10.0
[%]
DISTORTION

IMAGING LENS AND IMAGING APPARATUS

FIELD

The present disclosure relates to a bright imaging lens system which has a photographing view angle of about 40 to 90 degrees and an F-number of about 3.5 or less, and in particular, to an imaging lens which is used in an interchangeable lens device of a so-called interchangeable lens digital camera, and an imaging apparatus provided with the imaging lens.

BACKGROUND

Although there are several types of bright lenses having a photographing view angle of about 40 to 90 degrees and an F-number of about 3.5 or less for an interchangeable lens camera system, Gaussian-type lenses are widely known (refer to JP-A-6-337348 and JP-A-2009-58651). In the Gauss-type lens, the whole lens system or a part of lens group is moved in the optical axis direction when focusing is performed. In addition, other than the Gauss-type lens, a lens system has been proposed in which a first lens group having positive refractive power and a second lens group having negative refractive power are included, and the first lens group is moved in the optical axis direction when focusing is performed (for example, refer to JP-A-2009-210910).

SUMMARY

Recently, interchangeable lens digital cameras have rapidly become widespread. Particularly, since moving images can be captured in an interchangeable lens camera system, there is a demand for a lens that is suitable not only for capturing a still image but also for capturing moving images. When a moving image is captured, it is necessary to move a lens group that performs focusing at high speed so as to follow rapid movement of a subject. With regard to the bright imaging lens which has a photographing view angle of about 40 to 90 degrees and an F-number of about 3.5 or less, there is a demand to perform focusing at high speed so as to correspond to the capturing of moving images.

In JP-A-6-337348 and JP-A-2009-58651, the Gaussian-type lens has been proposed. When focusing is performed, the whole lens system or a former lens group and a rear lens group that have a diaphragm interposed therebetween are independently moved in the optical axis direction. However, when attempting to perform focusing by moving the whole lens system at high speed for photographing a moving image, the weight of the focusing lens group is heavy, so that the size of an actuator used for moving the lenses becomes large. Accordingly, there is a problem in that the size of a lens barrel becomes large. In addition, when attempting to perform focusing at high speed by independently moving the former lens group and the rear lens group, a plurality of actuators are built into the lens barrel, so that there is a problem in that the size of the lens barrel becomes large.

In an imaging lens disclosed in JP-A-2009-210910, a first lens group is moved in the optical axis direction when focusing is performed. When attempting to perform focusing at high speed for capturing moving images, since the weight of the first lens group is heavy, the size of a driving actuator becomes large, so that the size of the lens barrel becomes large.

It is therefore desirable to provide an imaging lens, which is compact and is capable of performing focusing at high speed, and an imaging apparatus.

An embodiment of the present disclosure is directed to an imaging lens including a first lens group; a second lens group having positive refractive power; and a third lens group having negative refractive power in order from an object side. The first lens group includes a former lens group having a negative lens in the most object side, a diaphragm, and a rear lens group. When focusing is performed, the second lens group is moved in the optical axis direction.

Another embodiment of the present disclosure is directed to an imaging apparatus including an imaging lens; and an imaging device which outputs an imaging signal based on an optical image formed by the imaging lens. The imaging lens is configured using the imaging lens according to the embodiment of the present disclosure.

In the imaging lens or the imaging apparatus according to the embodiment of the present disclosure, the second lens group from among the three lens groups is moved in the optical axis direction when focusing is performed.

In the imaging lens or the imaging apparatus according to the embodiment of the present disclosure, the second lens group from among the three lens groups is moved in the optical axis direction when focusing is performed, so that it is compact and focusing can be performed at high speed.

BRIEF DESCRIPTION OF THE DRAWINGS

FIG. 5 is a cross-sectional view illustrating a fifth configuration example of the imaging lens, and illustrating a lens corresponding to a fifth numerical embodiment;

FIGS. 6A to 6C are aberration views illustrating aberrations when the imaging lens corresponding to the first numerical embodiment performs infinite focusing, and FIGS. 6A to 6C respectively illustrate spherical aberration, astigmatism, and distortion;

FIGS. 15A to 15C are aberration views illustrating aberrations when the imaging lens corresponding to the fifth numerical embodiment performs focusing at close range (β=−0.5), and FIGS. 15A to 15C respectively illustrate spherical aberration, astigmatism, and distortion.

DETAILED DESCRIPTION

Hereinafter, embodiments according to the present disclosure will be described in detail with reference to the accompanying drawings.

[Lens Configuration]

Figure 1:
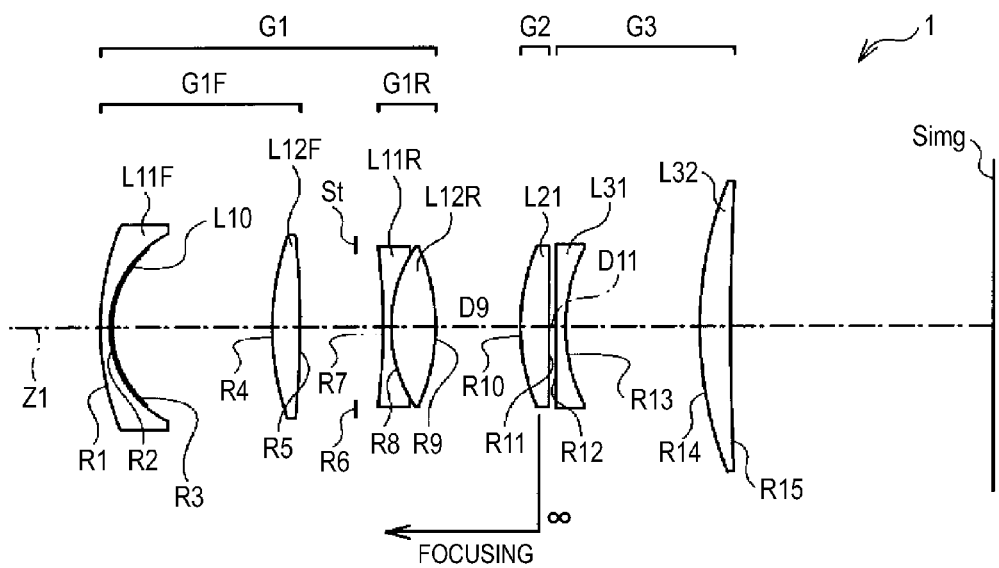
FIG. 1 is a cross-sectional view illustrating a first configuration example of an imaging lens according to an embodiment of the present disclosure, and illustrating a lens corresponding to a first numerical embodiment.

FIG. 1 illustrates a first configuration example of an imaging lens according to an embodiment of the present disclosure. This configuration example corresponds to a lens configuration according to a first numerical embodiment which will be described later. Meanwhile, FIG. 1 corresponds to lens arrangement when infinite focusing is performed. In the same manner, FIGS. 2 to 5 illustrate cross-sectional configurations according to second to fifth configuration examples which correspond to lens configurations according to second to fifth numerical embodiments which will be described later. In FIGS. 1 to 5, reference symbol "Ri" represents the curvature radius of an i-th surface in which reference symbol is assigned in such a way that the surface of a component in the most object side is designated as a first surface and the reference symbol sequentially increases toward an image side (focal side). Reference symbol "Di" represents the surface separation between the i-th surface and an (i+1)-th surface on an optical axis Z1. Meanwhile, with regard to the reference symbol "Di", reference symbol is assigned only to the surface separations (for example, D9 and D11 in FIG. 1) of the part which varies in association with focusing. Reference symbol "Simg" indicates an image surface.

The imaging lens according to the present embodiment substantially includes three lens groups in order from an object side along the optical axis Z1, that is, a first lens group G1, a second lens group G2 having positive refractive power, and a third lens group G3 having negative refractive power. The first lens group G1 includes a former lens group G1F, a diaphragm St, and a rear lens group G1R. When focusing is performed, the second lens group G2 is moved in the optical axis direction. The first lens group G1 and the third lens group G3 are fixed when focusing is performed.

It is preferable that the diaphragm St (opening diaphragm) be arranged in the position which is adjacent to the rear lens group G1R of the first lens group G1. As a specific configuration example, the diaphragm St is arranged between the former lens group G1F and the rear lens group G1R of the first lens group G1 in any of the imaging lenses 1 to 5 according to the first to fifth configuration examples.

In the first lens group G1, the former lens group G1F includes a negative lens in the most object side. As a specific configuration example, a negative meniscus lens L11F, which faces a convex surface in the object side, is provided as the negative lens in the most object side of the former lens group G1F in any of the imaging lenses 1 to 5 according to the first to fifth configuration examples.

It is preferable that the rear lens group G1R includes a negative lens and a positive lens. The negative lens and the positive lens may be a cemented lens. As the specific configuration example, the rear lens group G1R includes a negative lens L11R and a positive lens L12R in any of the imaging lenses 1 to 5 according to the first to fifth configuration examples. In particular, in the configuration examples other than the imaging lens 3 according to the third configuration example, the negative lens L11R and the positive lens L12R correspond to the cemented lens.

It is preferable that the second lens group G2 includes one positive lens. As a specific configuration example, a lens L21 of the second lens group G2 corresponds to one positive lens in the configuration examples other than the imaging lens 5 according to the fifth configuration example.

The third lens group G3 includes a negative lens. It is preferable that the negative lens has the larger curvature of an image surface side than the curvature of the object side (the absolute value of the curvature radius of the image surface side is smaller than that of the object side). As a specific configuration example, in the imaging lens 1, 4, and 5 according to the first, fourth, and fifth configuration examples, a first lens L31 of the third lens group G3 is configured such that the curvature of the image surface side is larger than the curvature of the object side. Further, the imaging lenses 2 and 3 according to the second and third configuration examples, a second lens L32 of the third lens group G3 is configured such that the curvature of the image surface side is larger than the curvature of the object side.

It is preferable that the imaging lens according to the present embodiment be configured such that the following Conditional Equation is appropriately and selectively satisfied.

$$-2.0 < f3/f < -0.8 \quad (1)$$

$$0.1 < \beta2 < 0.5 \quad (2)$$

$$1.0 < \beta3 < 2.5 \quad (3)$$

$$\nu1Rp - \nu1Rn > 25 \quad (4)$$

$$1 < t3i/R3b < 4 \quad (5)$$

wherein
 f3: the focal length of the third lens group G3,
 f: the focal length of the whole lens system,
 β2: the lateral magnification of the second lens group G2,
 β3: the lateral magnification of the third lens group G3,
 ν1Rp: Abbe number for the "d" line of the positive lens of the rear lens group G1R,
 ν1Rn: Abbe number for the "d" line of the negative lens of the rear lens group G1R, t3i: length to an image surface from the apex of the surface of the image surface side of the negative lens of the third lens group G3, and R3b: the curvature radius of the image surface side of the negative lens of the third lens group G3

[Operation and Effect]

Next, the operation and effect of the imaging lens according to the present embodiment will be described.

In this imaging lens, the negative lens is arranged in the most object side, and the angle of incidence of the off-axis light flux is lessened and light is incident on the second lens group G2 which is the focus lens group, so that it is possible to suppress the variation in an image surface by performing focusing. Further, the external form of the second lens group G2 can be small, so that the weight thereof can be lightened. Therefore, the imaging lens can be moved at high speed using a small actuator when focusing is performed. Further, the entrance pupil approaches the object side, thereby contributing to downsizing the lens radius. Further, back-focus can be shortened by tilting the light flux, the angle of which was lessened because negative power is given to the third lens group G3, so that the whole length of the lens can be shortened. Further, chromatic aberration can be corrected by disposing the positive and negative lenses in the rear lens group G1R of the first lens group G1 which is adjacent to the diaphragm St.

In this imaging lens, the cemented lens in which the positive lens is bonded to the negative lens is used as the rear lens group G1R in the first lens group G1, so that chromatic aberration can be effectively corrected.

Further, the second lens group G2 includes only one positive lens, so that the weight thereof is lightened, thereby enabling the lens to be moved at high speed using a small-sized actuator when focusing is performed.

Further, the negative lens in the third lens group G3 is configured such that the curvature of the image surface side is larger than the curvature of the object side (the absolute value of the curvature radius of the image surface side is smaller than that of the object side), so that aberrations can be corrected. In contrast, when the curvature of the object side is large, spherical aberration occurs.

Conditional Equation (1) defines the focal length of the third lens group G3. In a case where the focal length is below the range represented in Conditional Equation (1), the power of the third lens group G3 weakens, so that an effect of tilting the angle of the off-axis light flux is reduced, thereby increasing the whole length of the lens. In the case where the focal length is above the range represented in Conditional Equation (1), the power of the third lens group G3 strengthens, so that chromatic aberration occurs.

It is preferable that the numerical range of Conditional Equation (1) be set according to the following Conditional Equation (1)'. When the numerical range of Conditional Equation (1) is set to the numerical range of Conditional Equation (1)', the whole length of the lens can be suppressed and the chromatic aberration can be further suppressed.

$$-2.0 < f3/f < -1.2 \quad (1)'$$

Conditional Equation (2) defines the lateral magnification of the second lens group G2. In a case where the lateral magnification is below the range represented in Conditional Equation (2), the power of the second lens group G2 is too strong, with the result that eccentricity sensitivity is large, so that the difficulty level of production rises. In a case where the lateral magnification is above the range represented in Conditional Equation (2), the focus sensitivity decreases and a focus stroke increases, so that the whole length of the lens increases.

Conditional Equation (3) defines the lateral magnification of the third lens group G3. In a case where the lateral magnification is below the range represented in Conditional Equation (3), the focus sensitivity decreases, with the result that a focus stroke increases, so that the whole length of the lens increases. In a case where the lateral magnification is above the range represented in Conditional Equation (3), the power of the third lens group G3 becomes too strong, with the result that eccentricity sensitivity increases, so that the difficulty level of production rises.

Conditional Equation (4) defines the Abbe number difference in the positive and negative lenses of the rear lens group G1R in the first lens group G1. In a case where the Abbe number difference is below the range represented in Conditional Equation (4), it is difficult to sufficiently correct the chromatic aberration.

Conditional Equation (5) defines the curvature radius of the image surface side of the negative lens in the third lens group G3. In a case where the curvature radius of the image surface side is below the range represented in Conditional Equation (5), an effect of tilting the angle of the off-axis light flux is reduced, so that the whole length of the lens increases. In a case where the curvature radius of the image surface side is above the range represented in Conditional Equation (5), spherical aberration occurs, therefore performance deteriorates.

It is preferable that the numerical range of Conditional Equation (5) be set according to the following Conditional Equation (5)'. When the numerical range of Conditional Equation (5) is set to the numerical range of Conditional Equation (5)', the whole length of the lens can be suppressed and, further, the occurrence of the spherical aberration can be suppressed.

$$1.5 < t3i/R3b < 3 \quad (5)'$$

According to the above-described present embodiment, it is possible to implement an imaging lens which is compact, can perform focusing at high speed, and has high image formation performance.

[Application Example of Imaging Apparatus]

Figure 16:
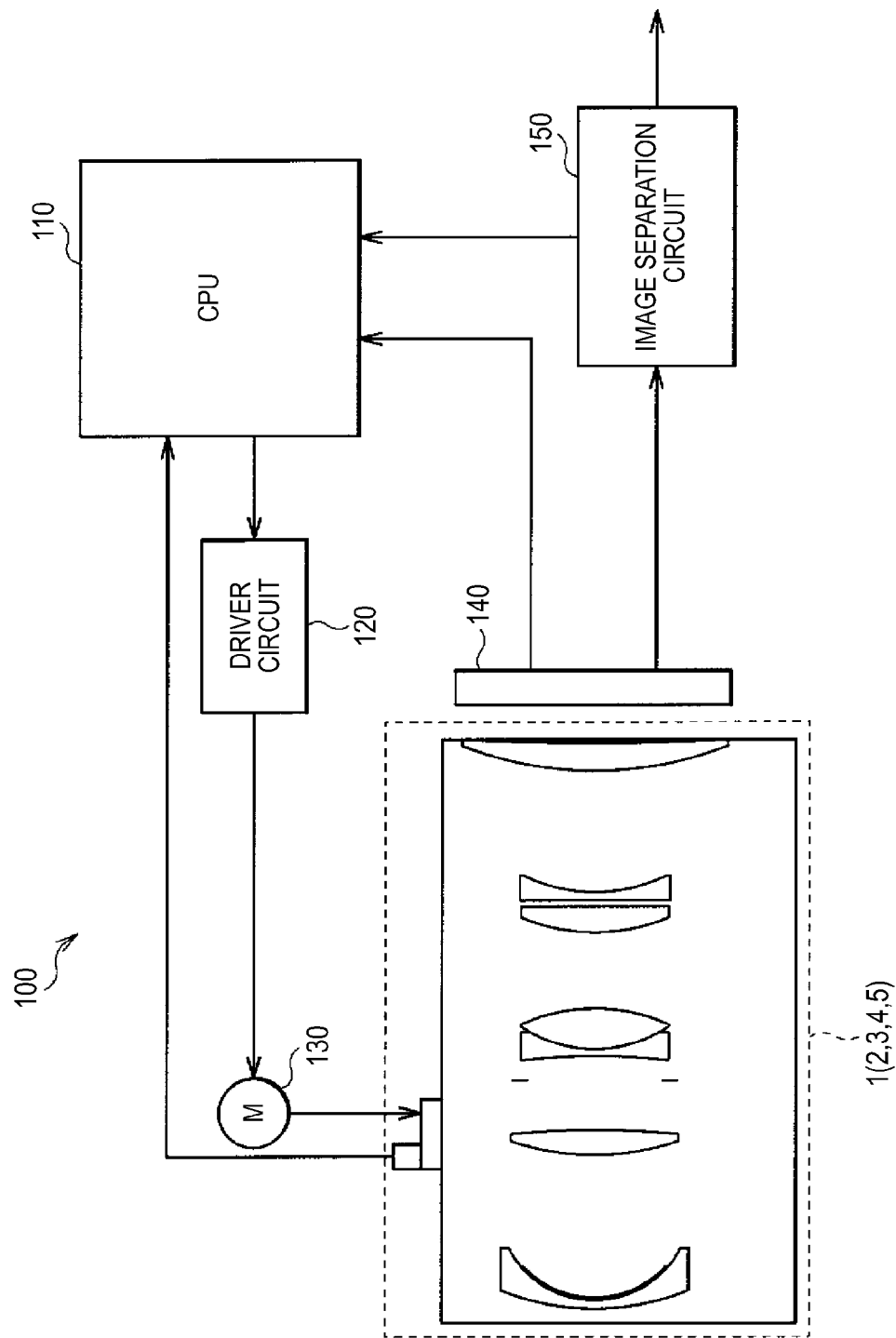
FIG. 16 is a block diagram illustrating a configuration example of an imaging apparatus.

FIG. 16 illustrates a configuration example of an imaging apparatus 100 to which the imaging lens according to the present embodiment is applied. The imaging apparatus 100 is, for example, a digital still camera. A Central Processing Unit (CPU) 110 performs integral control of the whole imaging apparatus 100. An optical image obtained using the above-described imaging lens 1 (2, 3, 4, or 5) is converted into an electrical signal using an imaging device 140, and the electrical signal is transmitted to an image separation circuit 150. Here, a photoelectric conversion device, for example, a Charge Coupled Device (CCD), a Complementary Metal-Oxide Semiconductor (CMOS), or the like is used as the imaging device 140. The image separation circuit 150 generates a focus control signal based on the electrical signal, transmits the focus control signal to the CPU 110, and, at the same time, transmits an image signal corresponding to the image part of the electrical signal to an image processing circuit (not shown) at a latter stage. In the image processing circuit, the format of the corresponding signal is converted into a signal format which is suitable for a subsequent process, and then provided for an image display process for a display unit, a recording process for a predetermined recording medium, a data transmission process via a predetermined communication interface, or the like.

The CPU 110 receives an operational signal, such as a focusing operational signal or the like, from the outside and performs various types of processes in response to the operational signal. When, for example, the focusing operational signal is supplied using a focusing button, the CPU 110 normalizes focusing according to the instruction, and operates a driving motor 130 via a driver circuit 120. Therefore, the CPU 110 of the imaging apparatus 100 moves the focus lens group (the second lens group G2) of the imaging lens 1 along the optical axis in response to the focusing operational signal. Meanwhile, the CPU 110 of the imaging apparatus 100 feedbacks information about the position of the focus lens group at that time, and then refers to the information when moving the focus lens group using the driving motor 130.

That is, although only one system is shown as a drive system in this imaging apparatus 100 in order to simplify explanation, a zoom system, a focus system, a photographing mode switching system, and the like may be individually provided. Further, when a camera shake correction function is provided, a vibration control drive system may be provided in order to drive a shake correction lens (group). Further, some of the above-described drive systems can be commonly used.

Further, although the case where a digital still camera is used as the specific object of the imaging apparatus 100 has been described in the above-described embodiment, the embodiment of the present disclosure is not limited thereto and other various types of electronic devices may be used as the specific object of the imaging apparatus 100. For example, other various types of electronic device, such as an interchangeable lens camera, a digital video camera, a mobile phone equipped with the digital video camera, a Personal Digital Assistant (PDA) and the like may be used as the detailed objects of the imaging apparatus 100.

EMBODIMENT

Next, specific numerical embodiments of the imaging lens according to the present embodiment will be described.

First Numerical Embodiment

Table 1 to Table 3 show specific lens data corresponding to the imaging lens 1 according to the first configuration example shown in FIG. 1. In particular, the basic lens data thereof is shown in Table 1, and the other data is shown in Table 2 and Table 3.

The surface number of the lens data shown in Table 1 represents the number of an i-th surface to which reference symbols are assigned in such a way that the surface of a component in the most object side is designated as a first surface and then the reference symbols sequentially increase toward the image side in the imaging lens 1. "Ri" corresponds to reference symbol "Ri" assigned in FIG. 1, and represents the curvature radius value (mm) of the i-th surface from the object side. In the same manner, "Di" represents the gap (mm) between the i-th surface and an (i+1)-th surface on the optical axis from the object side. "Ndj" represents a refractive index value for the "d" line (587.6 nm) of a j-th optical device from the object side. In the field of "vdj", the value of the Abbe number for the "d" line of the j-th optical device from the object side is shown.

In the imaging lens 1, since the second lens group G2 is moved when focusing is performed, the values of the front and back surface separations D9 and D11 of the second lens group G2 are variable. The data of the variable surface separations D9 and D11 are shown in Table 3. Meanwhile, "Fno." represents F-number, "f" represents the focal length of the whole lens system, "ω" represents a half angle, and "β" represents photographing magnitude in Table 3.

"STO" in Table 1 represents a diaphragm surface. A surface indicated using "ASP" is aspheric. An aspheric shape corresponds to a shape expressed using the following Equation. The aspheric curvature radius of the lens data of Table 1 represents the numerical value of a curvature radius in the vicinity of the optical axis (paraxial). The data of aspheric coefficients are shown in Table 3. In the numerical values shown in Table 3, reference symbol "E" represents that the subsequent numerical value thereof is an "exponent" based on 10, and that the numerical value expressed using an exponential function based on 10 is multiplied by the numerical value before "E". For example, "1.0E−05" represents "1.0× $10^{-5}$".

$$x = \frac{y^2 \cdot c^2}{1 + \sqrt{(1 - (1+K) \cdot y^2 \cdot c^2)}} + \sum Ai \cdot Yi \qquad \text{Expression 1}$$

wherein x: length in the optical axis direction from the apex of the lens surface, y: height in the direction which is perpendicular to the optical axis, c: paraxial curvature at the apex of lens, K: Korenich constant, and Ai: i-th order aspheric coefficient In the imaging lens 1, the former lens group G1F of the first lens group G1 includes two lenses L11F and L12F. In detail, in order from the object side, the former lens group G1F includes the negative meniscus lens L11F facing the convex surface to the object side and having a composite aspheric surface L10 in the image side, and a biconvex lens (lens L12F). The rear lens group G1R includes a cemented lens which includes a biconcave lens (negative lens L11R) and a biconvex lens (positive lens L12R). The second lens group G2 includes one lens L21. The lens L21 corresponds to a double-sided aspheric positive lens. The third lens group G3 includes two lenses L31 and L32. The first lens L31 of the third lens group G3 corresponds to a negative lens in which the curvature of the image surface side is larger than that of the object side. The second lens L32 of the third lens group G3 corresponds to a positive lens. Images can be shifted by moving the whole third lens group G3 or the negative lens (the first lens L31) of the third lens group G3 in the direction which is perpendicular to the optical axis Z1.

TABLE 1

Embodiment 1

| Surface No. | Ri | Di | Ndj | vdj |
|---|---|---|---|---|
| 1 | 21.787 | 0.850 | 1.618 | 63.40 |
| 2 | 8.856 | 0.200 | 1.5361 | 41.20 |
| 3(ASP) | 8.336 | 13.453 | | |
| 4 | 24.960 | 2.292 | 1.8061 | 33.27 |
| 5 | −63.936 | 4.614 | | |
| 6(STO) | — | 2.260 | | |
| 7 | −61.739 | 0.700 | 1.6889 | 31.16 |
| 8 | 11.520 | 3.735 | 1.4875 | 70.44 |
| 9 | −16.411 | D9 | | |
| 10(ASP) | 18.317 | 2.372 | 1.5920 | 67.02 |
| 11(ASP) | −176.102 | D11 | | |
| 12 | 106.000 | 0.850 | 1.8344 | 37.29 |
| 13(ASP) | 14.073 | 11.272 | | |
| 14 | 32.953 | 2.554 | 1.7618 | 26.61 |
| 15 | 169.811 | 22.110 | | |

TABLE 2

Embodiment 1

| Surface No. | K | A4 | A6 | A8 | A10 |
|---|---|---|---|---|---|
| 3 | 0.00000 | −6.74766E−05 | −2.34337E−06 | 3.17317E−08 | −8.25161E−10 |
| 10 | 0.00000 | 2.00029E−05 | −6.10779E−07 | 1.83980E−08 | 8.06243E−11 |
| 11 | 0.00000 | 4.32087E−05 | −7.67045E−07 | 2.44347E−08 | 0.000000E+00 |
| 13 | 0.00000 | −1.32997E−05 | 1.10715E−07 | −1.11375E−08 | 1.54351E−10 |

TABLE 3

Embodiment 1

| | Infinite focusing | Focusing at close range |
|---|---|---|
| Fno. | 3.58 | — |
| f | 29.11 | — |
| ω | 25.55 | — |
| β | 0.000 | −1.0 |
| D9 | 7.244 | 0.183 |
| D11 | 0.494 | 7.555 |

Second Numerical Embodiment

Figure 2:
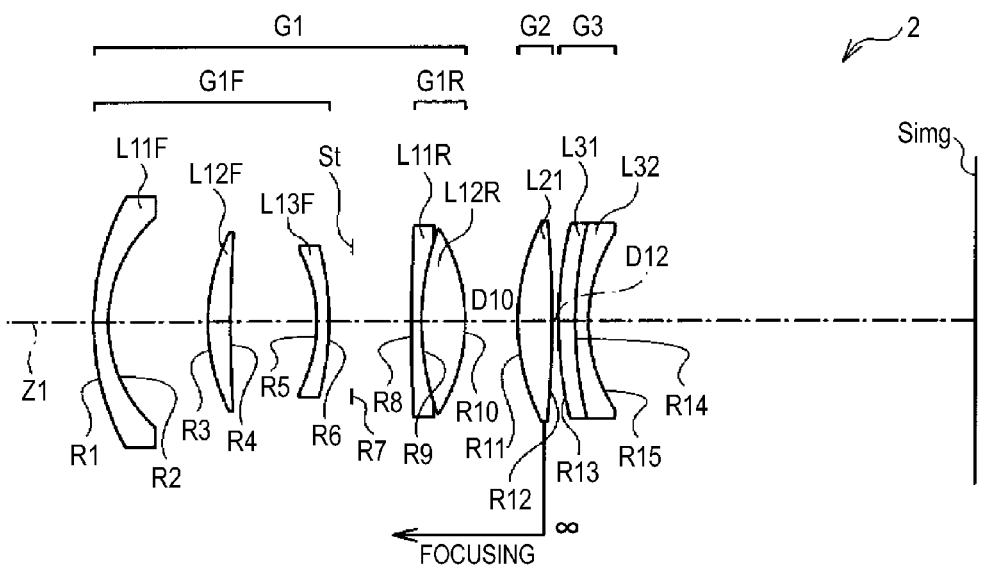
FIG. 2 is a cross-sectional view illustrating a second configuration example of the imaging lens, and illustrating a lens corresponding to a second numerical embodiment.

In the same manner as in the above-described first numerical embodiment, specific lens data corresponding to the configuration of the imaging lens 2 according to the second configuration example shown in FIG. 2 is shown in Table 4 to Table 6 as a second numerical embodiment.

In the imaging lens 2, the former lens group G1F of the first lens group G1 includes three lenses L11F, L12F, and L13F. In detail, in order from the object side, the former lens group G1F includes the negative meniscus lens L11F facing the convex surface to the object side and having an aspheric surface in the image side, a positive meniscus lens (lens L12F), and a convex negative meniscus lens (lens L13F) in the image surface side. The rear lens group G1R includes a cemented lens having a negative meniscus lens (negative lens L11R) and a biconvex lens (positive lens L12R). The second lens group G2 includes one lens L21. The lens L21 corresponds to a double-sided aspheric positive lens. The third lens group G3 includes two lenses L31 and L32. The first lens L31 of the third lens group G3 corresponds to a positive meniscus lens. The second lens L32 of the third lens group G3 corresponds to a negative meniscus lens in which the curvature of the image surface side is larger than the curvature of the object side. Images can be shifted by moving the whole third lens group G3 in the direction which is perpendicular to the optical axis Z1.

TABLE 4

Embodiment 2

| Surface No. | Ri | Di | Ndj | vdj |
|---|---|---|---|---|
| 1 | 23.359 | 1.200 | 1.5533 | 71.68 |
| 2(ASP) | 11.000 | 8.563 | | |
| 3 | 17.996 | 1.912 | 1.6200 | 36.30 |
| 4 | 110.574 | 7.236 | | |
| 5 | −12.612 | 1.000 | 1.7234 | 37.99 |
| 6 | −26.777 | 2.000 | | |
| 7(STO) | — | 5.185 | | |
| 8 | 303.484 | 0.700 | 1.8061 | 33.27 |
| 9 | 22.552 | 3.770 | 1.4875 | 70.44 |
| 10 | −14.794 | D10 | | |
| 11(ASP) | 17.588 | 3.000 | 1.5920 | 67.02 |
| 12(ASP) | −94.281 | D12 | | |
| 13 | 36.053 | 1.500 | 1.7618 | 26.61 |
| 14 | 41.351 | 0.994 | 1.6385 | 55.45 |
| 15 | 14.000 | 32.925 | | |

TABLE 5

Embodiment 2

| Surface No. | K | A4 | A6 | A8 | A10 |
|---|---|---|---|---|---|
| 2 | 0.00000 | −4.25524E−05 | −8.54908E−07 | 6.15176E−09 | −8.16484E−11 |
| 11 | 0.00000 | −1.27940E−05 | −3.24838E−07 | 6.15625E−09 | −6.06649E−11 |
| 12 | 0.00000 | 8.04705E−06 | −3.14081E−07 | 5.78026E−09 | −5.80246E−11 |

TABLE 6

Embodiment 2

| | Infinite focusing | Focusing at close range |
|---|---|---|
| Fno. | 3.58 | — |
| f | 29.1 | — |
| ω | 25.13 | — |
| β | 0.000 | −0.5 |
| D10 | 4.515 | 0.3 |
| D12 | 0.5 | 4.715 |

Third Numerical Embodiment

Figure 3:
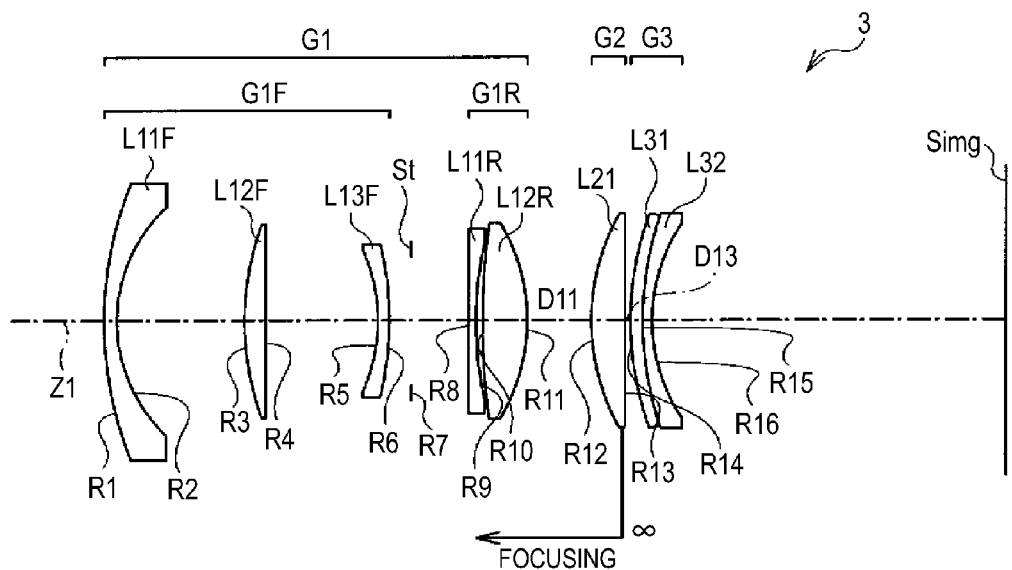
FIG. 3 is a cross-sectional view illustrating a third configuration example of the imaging lens, and illustrating a lens corresponding to a third numerical embodiment.

In the same manner, specific lens data corresponding to the configuration of the imaging lens 3 according to the third configuration example shown in FIG. 3 is shown in Table 7 to Table 9 as a third numerical embodiment.

In the imaging lens 3, the former lens group G1F of the first lens group G1 includes three lenses L11F, L12F, and L13F. In detail, in order from the object side, the former lens group G1F includes the negative meniscus lens L11F facing the convex surface to the object side and having an aspheric surface in the image side, a positive meniscus lens (lens L12F), and a convex negative meniscus lens (lens L13F) in the image surface side. The rear lens group G1R includes a negative meniscus lens (negative lens L11R) and a biconvex lens (positive lens L12R). The second lens group G2 includes one lens L21. The lens L21 corresponds to a double-sided aspheric positive lens. The third lens group G3 includes two lenses L31 and L32. The first lens L31 of the third lens group G3 corresponds to a positive meniscus lens. The second lens L32 of the third lens group G3 corresponds to a negative meniscus lens in which the curvature of the image surface side is larger than the curvature of the object side. Images can be shifted by moving the whole third lens group G3 in the direction which is perpendicular to the optical axis Z1.

TABLE 7

Embodiment 3

| Surface No. | Ri | Di | Ndj | vdj |
|---|---|---|---|---|
| 1 | 32.795 | 1.200 | 1.4875 | 70.44 |
| 2(ASP) | 12.254 | 11.286 | | |
| 3 | 25.091 | 1.826 | 1.7234 | 37.99 |
| 4 | 334.792 | 10.000 | | |
| 5 | −15.535 | 1.000 | 1.7618 | 26.61 |
| 6 | −26.544 | 2.000 | | |
| 7(STO) | — | 5.000 | | |
| 8 | 311.336 | 0.700 | 1.6889 | 31.16 |
| 9 | 32.409 | 0.574 | | |
| 10 | 60.962 | 3.914 | 1.4970 | 81.61 |
| 11 | −16.845 | D11 | | |
| 12(ASP) | 18.770 | 3.000 | 1.5920 | 67.02 |
| 13(ASP) | −442.425 | D13 | | |
| 14 | 27.545 | 1.119 | 1.7618 | 26.61 |
| 15 | 28.877 | 0.700 | 1.6935 | 53.34 |
| 16 | 14.578 | 31.424 | | |

TABLE 8

Embodiment 3

| Surface No. | K | A4 | A6 | A8 | A10 |
|---|---|---|---|---|---|
| 2 | 0.00000 | −3.15507E−05 | −4.53021E−07 | 2.76682E−09 | −2.97821E−11 |
| 12 | 0.00000 | −8.84518E−06 | −2.13043E−08 | −1.29856E−09 | 1.39141E−11 |
| 13 | 0.00000 | 3.97276E−06 | −1.07962E−08 | −1.84318E−09 | 1.85934E−11 |

TABLE 9

Embodiment 3

| | Infinite focusing | Focusing at close range |
|---|---|---|
| Fno. | 3.58 | — |
| f | 29.1 | — |
| ω | 24.94 | — |
| β | 0.000 | −0.5 |
| D11 | 5.756 | 0.3 |
| D13 | 0.5 | 5.956 |

Fourth Numerical Embodiment

Figure 4:
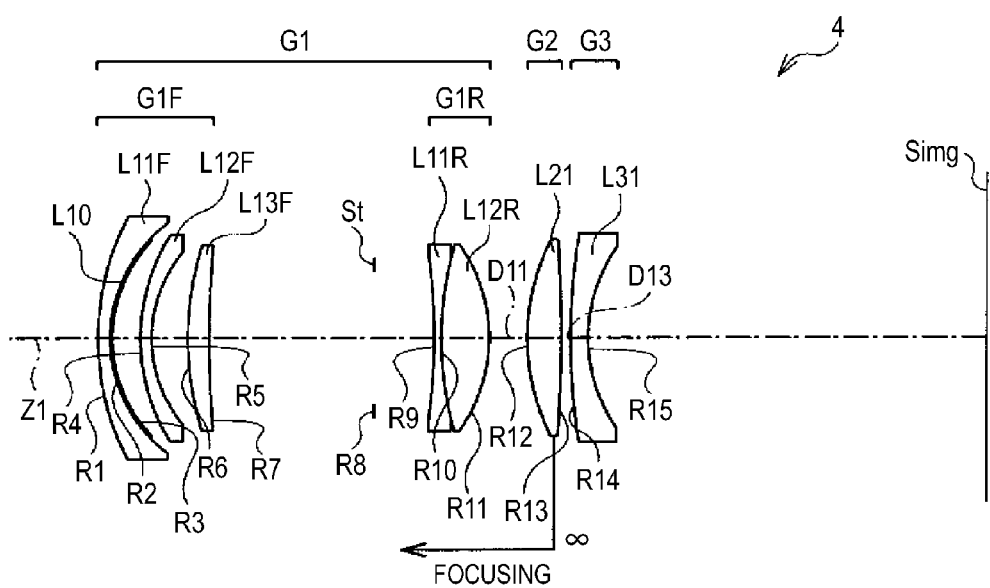
FIG. 4 is a cross-sectional view illustrating a fourth configuration example of the imaging lens, and illustrating a lens corresponding to a fourth numerical embodiment.

In the same manner, specific lens data corresponding to the configuration of the imaging lens 4 according to the fourth configuration example shown in FIG. 4 is shown in Table 10 to Table 12 as a fourth numerical embodiment.

In the imaging lens 4, the former lens group G1F of the first lens group G1 includes three lenses L11F, L12F, and L13F. In detail, in order from the object side, the former lens group G1F includes the negative meniscus lens L11F facing the convex surface to the object side and having a composite aspheric surface L10 in the image side, a negative meniscus lens (lens L12F) facing the convex surface to the object side, and a positive meniscus lens (lens L13F). The rear lens group G1R includes a cemented lens having a biconcave lens (negative lens L11R) and a biconvex lens (positive lens L12R). The second lens group G2 includes one lens L21. The lens L21 corresponds to a double-sided aspheric positive lens. The third lens group G3 includes one lens L31. The lens L31 includes a negative meniscus lens facing the convex to the object side. Images can be shifted by moving the whole third lens group G3 in the direction which is perpendicular to the optical axis Z1.

TABLE 10

Embodiment 4

| Surface No. | Ri | Di | Ndj | vdj |
|---|---|---|---|---|
| 1 | 22.117 | 1.000 | 1.5168 | 64.20 |
| 2 | 12.161 | 0.200 | 1.5361 | 41.20 |
| 3(ASP) | 11.000 | 2.344 | | |
| 4 | 16.156 | 1.000 | 1.5168 | 64.20 |
| 5 | 11.503 | 3.000 | | |
| 6 | 25.067 | 1.930 | 1.7234 | 37.99 |
| 7 | 143.206 | 13.862 | | |
| 8(STO) | — | 5.000 | | |
| 9 | −70.081 | 0.700 | 1.8061 | 33.27 |
| 10 | 28.748 | 4.000 | 1.4875 | 70.44 |
| 11 | −13.790 | D11 | | |
| 12(ASP) | 17.429 | 3.000 | 1.5920 | 67.02 |

TABLE 10-continued

Embodiment 4

| Surface No. | Ri | Di | Ndj | vdj |
|---|---|---|---|---|
| 13(ASP) | −135.374 | D13 | | |
| 14 | 64.689 | 1.500 | 1.4875 | 70.44 |
| 15 | 14.325 | 33.506 | | |

TABLE 11

Embodiment 4

| Surface No. | K | A4 | A6 | A8 | A10 |
|---|---|---|---|---|---|
| 3 | 0.00000 | −3.50445E−05 | −6.71702E−07 | 5.07838E−09 | −7.37055E−11 |
| 12 | 0.00000 | −1.85761E−05 | 1.62152E−07 | −4.51147E−09 | 2.73056E−11 |
| 13 | 0.00000 | −2.10612E−06 | 2.01296E−07 | −5.60362E−09 | 3.68831E−11 |

TABLE 12

Embodiment 4

| | Infinite focusing | Focusing at close range |
|---|---|---|
| Fno. | 3.59 | — |
| f | 29.1 | — |
| ω | 25.414 | — |
| β | 0.000 | −0.35 |
| D11 | 3.170 | 0.3 |
| D13 | 0.788 | 3.658 |

Fifth Numerical Embodiment

In the same manner, specific lens data corresponding to the configuration of the imaging lens 5 according to the fifth configuration example shown in FIG. 5 is shown in Table 13 to Table 15 as a fifth numerical embodiment.

In the imaging lens 5, the former lens group G1F of the first lens group G1 includes two lenses L11F and L12F. In detail, in order from the object side, the former lens group G1F includes a negative meniscus lens L11F facing the convex surface to the object side and having the aspheric surface in the image side, and a positive meniscus lens (lens L12F). The rear lens group G1R includes a cemented lens having a biconcave lens (negative lens L11R) and a biconvex lens (positive lens L12R). The second lens group G2 includes two lenses L21 and L22. In the second lens group G2, the first lens L21 corresponds to the positive meniscus lens, and the second lens L22 corresponds to the biconvex lens. The second lens group G2 includes a cemented lens in which two lenses L21 and L22 are bonded. The third lens group G3 includes two lenses L31 and L32. The first lens L31 of the third lens group G3 corresponds to the negative lens in which the curvature of the image surface side is larger than the curvature of the object side. The second lens L32 of the third lens group G3 corresponds to the positive lens. Images can be shifted by moving the whole third lens group G3 or the negative lens (first lens L31) of the third lens group G3 in the direction which is perpendicular to the optical axis Z1.

TABLE 13

Embodiment 5

| Surface No. | Ri | Di | Ndj | vdj |
|---|---|---|---|---|
| 1 | 29.048 | 0.850 | 1.5920 | 67.02 |
| 2(ASP) | 11.912 | 11.482 | | |
| 3 | 18.032 | 2.582 | 1.7234 | 37.99 |
| 4 | 934.040 | 9.309 | | |
| 5(STO) | — | 2.002 | | |
| 6 | −14.484 | 1.108 | 1.8061 | 33.27 |
| 7 | 16.625 | 4.500 | 1.6180 | 63.40 |
| 8 | −13.382 | D8 | | |
| 9(ASP) | 17.091 | 1.905 | 1.6188 | 63.86 |
| 10 | 37.025 | 2.280 | 1.7440 | 44.72 |
| 11 | −69.866 | D11 | | |
| 12 | −130.425 | 0.850 | 1.5814 | 40.89 |
| 13(ASP) | 13.574 | 9.662 | | |
| 14 | 38.078 | 2.965 | 1.7283 | 28.32 |
| 15 | −524.178 | 20.870 | | |

TABLE 14

Embodiment 5

| Surface No. | K | A4 | A6 | A8 | A10 |
|---|---|---|---|---|---|
| 2 | 0.00000 | −2.22741E−05 | −4.75340E−07 | 3.37393E−09 | −3.49539E−11 |
| 9 | 0.00000 | −3.31454E−05 | −7.51167E−08 | 1.62427E−09 | −1.19134E−11 |
| 13 | 0.00000 | −2.92154E−05 | −1.85627E−07 | 4.37025E−10 | −4.35039E−12 |

TABLE 15

Embodiment 5

| | Infinite focusing | Focusing at close range |
|---|---|---|
| Fno. | 2.89 | — |
| f | 29.1 | — |
| ω | 25.36 | — |
| β | 0.000 | −0.5 |
| D8 | 4.334 | 0.2 |
| D11 | 0.3 | 4.434 |

[Other Numerical Value Data of Each Embodiment]

In Table 16, values, which are related to each of the above-described Conditional Equation, are collected with respect to each numerical embodiment and shown. As understood from Table 16, with respect to each Conditional Equation, the values of each of the numerical embodiments fall within the numerical range thereof.

TABLE 16

| Conditional Equation | Embodiment 1 | Embodiment 2 | Embodiment 3 | Embodiment 4 | Embodiment 5 |
|---|---|---|---|---|---|
| (1) | −1.563 | −1.317 | −1.644 | −1.310 | −1.976 |
| (2) | 0.406 | 0.125 | 0.238 | 0.181 | 0.133 |
| (3) | 2.080 | 1.829 | 1.628 | 1.870 | 1.856 |
| (4) | 39.28 | 37.18 | 50.45 | 37.18 | 30.13 |
| (5) | 2.554 | 2.352 | 2.156 | 2.340 | 2.468 |

[Aberration Performance]

Figure 7A:
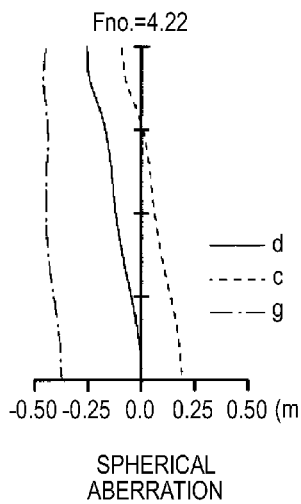
FIGS. 7A to 7C are aberration views illustrating aberrations when the imaging lens corresponding to the first numerical embodiment performs focusing at close range ($\beta$=−1), and FIGS. 7A to 7C respectively illustrate spherical aberration, astigmatism, and distortion.
Figure 7B:
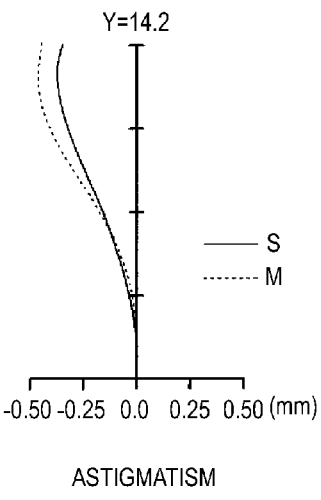
Figure 7C:
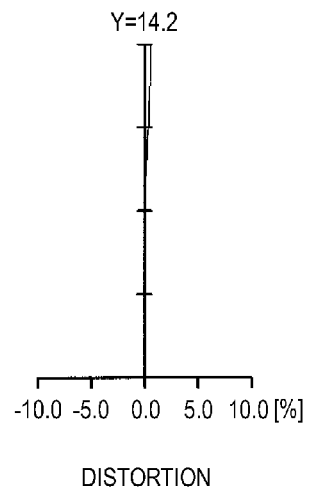
Figure 8A:
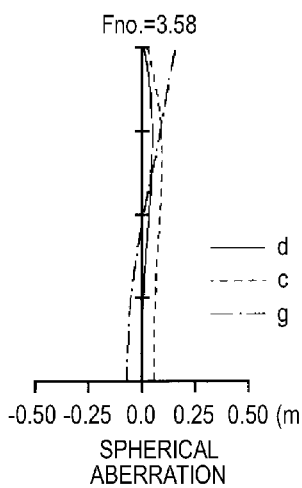
FIGS. 8A to 8C are aberration views illustrating aberrations when the imaging lens corresponding to the second numerical embodiment performs infinite focusing, and FIGS. 8A to 8C respectively illustrate spherical aberration, astigmatism, and distortion.
Figure 8B:
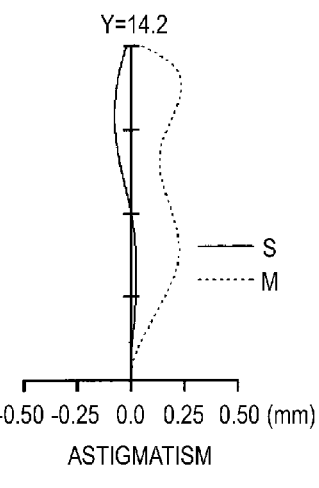
Figure 8C:
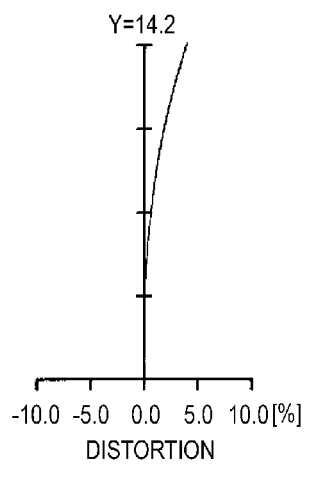
Figure 9A:
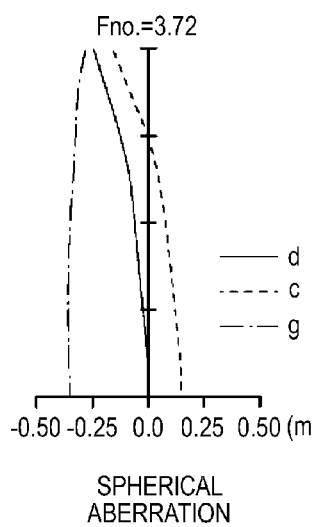
FIGS. 9A to 9C are aberration views illustrating aberrations when the imaging lens corresponding to the second numerical embodiment performs focusing at close range ($\beta$=−0.5), and FIGS. 9A to 9C respectively illustrate spherical aberration, astigmatism, and distortion.
Figure 9B:
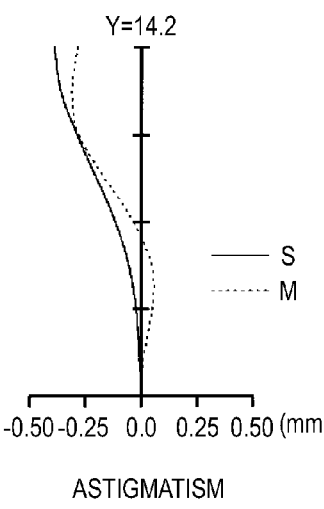
Figure 9C:
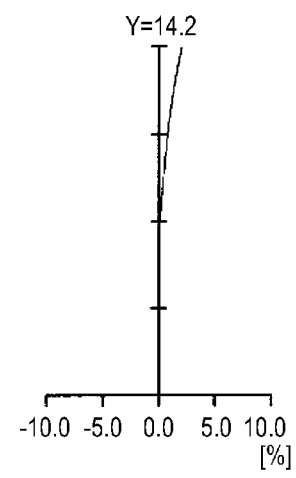
Figure 10A:
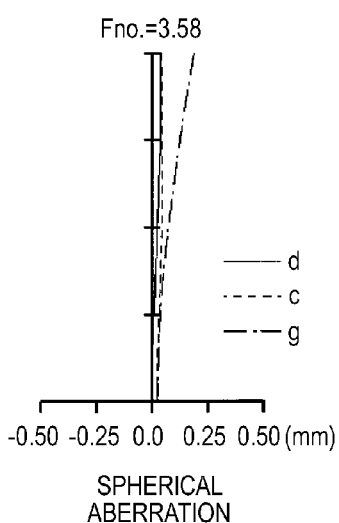
FIGS. 10A to 10C are aberration views illustrating aberrations when the imaging lens corresponding to the third numerical embodiment performs infinite focusing, and FIGS. 10A to 10C respectively illustrate spherical aberration, astigmatism, and distortion.
Figure 10B:
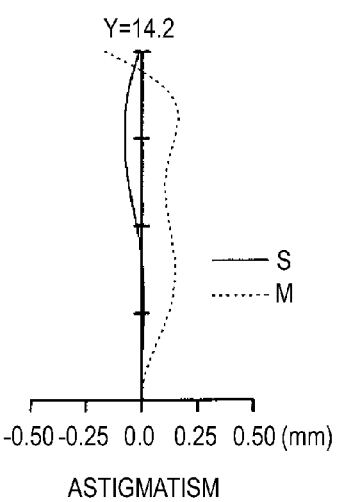
Figure 10C:
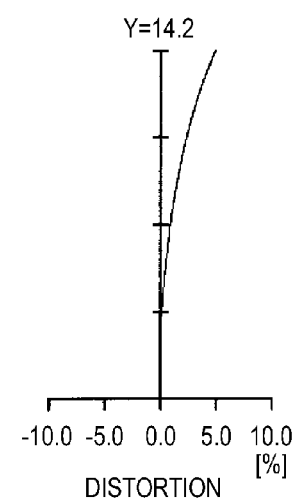
Figure 11A:
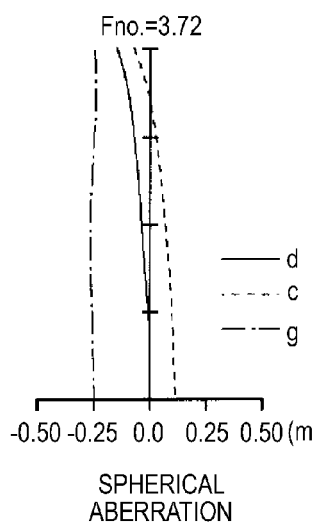
FIGS. 11A to 11C are aberration views illustrating aberrations when the imaging lens corresponding to the third numerical embodiment performs focusing at close range (β=−0.5), and FIGS. 11A to 11C respectively illustrate spherical aberration, astigmatism, and distortion.
Figure 11B:
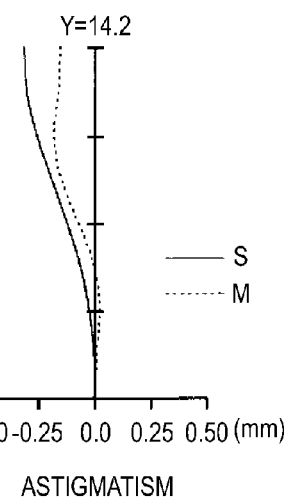
Figure 11C:
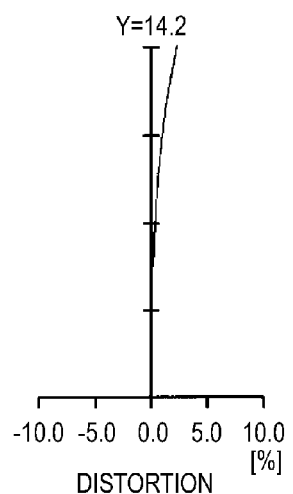
Figure 12A:
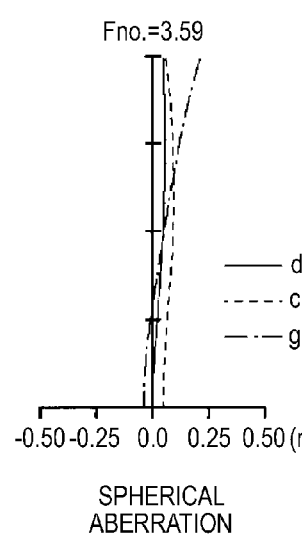
FIGS. 12A to 12C are aberration views illustrating aberrations when the imaging lens corresponding to the fourth numerical embodiment performs infinite focusing, and FIGS. 12A to 12C respectively illustrate spherical aberration, astigmatism, and distortion.
Figure 12B:
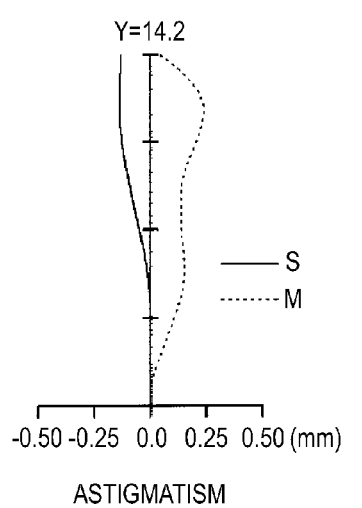
Figure 12C:
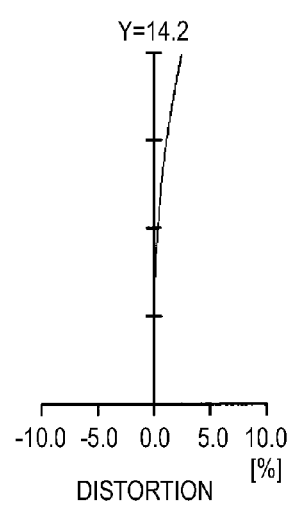
Figure 13A:
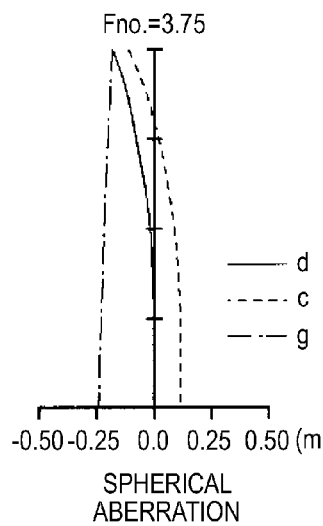
FIGS. 13A to 13C are aberration views illustrating aberrations when the imaging lens corresponding to the fourth numerical embodiment performs focusing at close range (β=−0.35), and FIGS. 13A to 13C respectively illustrate spherical aberration, astigmatism, and distortion.
Figure 13B:
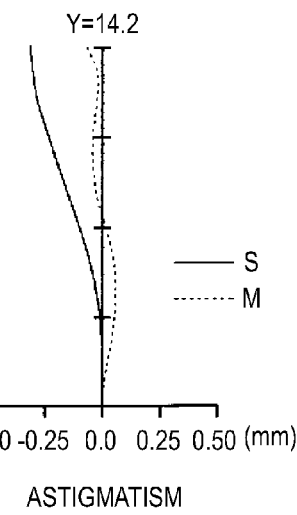
Figure 13C:
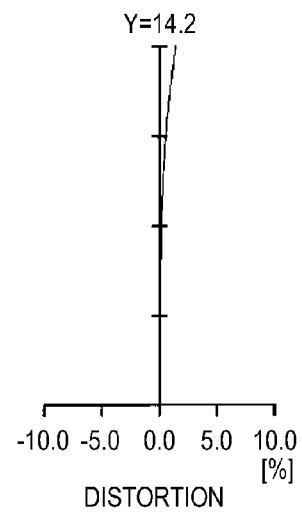
Figure 14A:
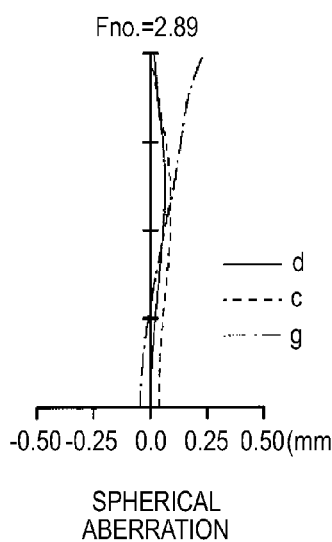
FIGS. 14A to 14C are aberration views illustrating aberrations when the imaging lens corresponding to the fifth numerical embodiment performs infinite focusing, and FIGS. 14A to 14C respectively illustrate spherical aberration, astigmatism, and distortion.
Figure 14B:
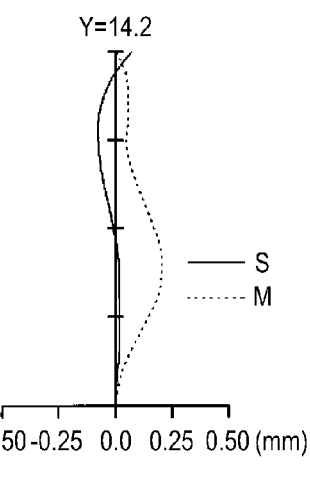
Figure 14C:
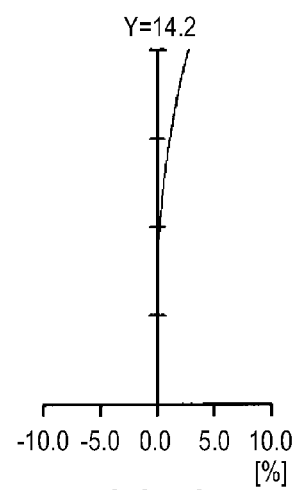

FIGS. 6A to 6C respectively illustrate spherical aberration, astigmatism, and distortion when the imaging lens 1 corresponding to the first numerical embodiment performs infinite focusing. FIGS. 7A to 7C respectively illustrate the aberrations when focusing is performed at close range in the same manner. Each aberration view shows aberration in which "d" line (587.6 nm) is set as the reference wavelength. Each spherical aberration view shows aberrations for "g" line (435.84 m) and "C" line (656.28 m). In the astigmatism view, the solid line represents aberration in the sagittal direction and the dotted line represents aberration in the meridional direction. "Fno." represents an F value and "Y" represents image height.

In the same manner, the aberrations of the imaging lens 2 corresponding to the second numerical embodiment are shown in FIGS. 8A to 8C and FIGS. 9A to 9C. In the same manner, the aberrations of the imaging lenses 3 to 5 corresponding to the third to fifth numerical embodiments are shown in FIGS. 10A to 15C.

As understood from each of the above-described aberration views, each aberration is corrected in a proper balance when infinite focusing is performed and when focusing is performed at close range according to each embodiments.

As understood from each of the above-described numerical value data and aberration views, it is possible to implement an imaging lens which is compact, can perform focusing at high speed, and has high image formation performance according to each embodiment.

Other Embodiments

The technology according to the embodiment of the present disclosure is not limited to the above-described description of the embodiments and examples, and various types of modifications are possible.

For example, although the three lens groups have been described in the above-described embodiment, a lens which does not substantially have refractive power may be further provided.

Further, the present disclosure can be implemented as the following configurations.

(1) An imaging lens including a first lens group;
a second lens group having positive refractive power; and a third lens group having negative refractive power, which are arranged in order from an object side. The first lens group includes a former lens group having a negative lens in a most object side, a diaphragm, and a rear lens group. When focusing is performed, the second lens group is moved in the optical axis direction.

(2) The imaging lens of (1) satisfying the following Conditional Equation:

$$-2.0 < f3/f < -0.8 \quad (1)$$

wherein
f3: a focal length of the third lens group, and
f: a focal length of a whole lens system.

(3) The imaging lens of (1) or (2) satisfying the following Conditional Equation:

$$0.1 < \beta 2 < 0.5 \quad (2)$$

$$1.0 < \beta 3 < 2.5 \quad (3)$$

wherein
β2: lateral magnification of the second lens group, and
β3: lateral magnification of the third lens group.

(4) In the imaging lens of any one of (1) to (3), the rear lens group includes a negative lens and a positive lens, and satisfies the following Conditional Equation:

$$\nu 1Rp - \nu 1Rn > 25 \quad (4)$$

wherein
ν1Rp: Abbe number for "d" line of the positive lens of the rear lens group, and
ν1Rn: Abbe number for "d" line of the negative lens of the rear lens group.

(5) In the imaging lens of any one of (1) to (4), the third lens group includes a negative lens in which the absolute value of the curvature radius of an image surface side is smaller than that of the object side.

(6) In the imaging lens of any one of (1) to (5), the third lens group includes the negative lens, and satisfies the following Conditional Equation:

$$1 < t3i/R3b < 4 \quad (5)$$

wherein
t3i: a length to an image surface from the surface apex of the image surface side of the negative lens of the third lens group, and
R3b: the curvature radius of the image surface side of the negative lens of the third lens group.

(7) In the imaging lens of any one of (1) to (6), the rear lens group is a cemented lens having a negative lens and a positive lens.

(8) In the imaging lens of any one of (1) to (7), the second lens group includes one positive lens.

(9) In the imaging lens of any one of (1) to (8), the diaphragm is arranged between the former lens group and the rear lens group of the first lens group.

(10) The imaging lens of any one of (1) to (9) further including a lens which does not substantially have refractive power.

The present disclosure contains subject matter related to that disclosed in Japanese Priority Patent Application JP 2011-127602 filed in the Japan Patent Office on Jun. 7, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging lens comprising:
a first lens group;
a second lens group having positive refractive power; and
a third lens group having negative refractive power, which are arranged in order from an object side,
wherein the first lens group includes a former lens group having a negative lens in a most object side, a diaphragm, and a rear lens group,
wherein, when focusing is performed, the second lens group is moved in the optical axis direction, wherein the imaging lens satisfies the following Conditional Equation:

$$-2.0 < f3/f < -0.8 \quad (1),$$

wherein
f3: a focal length of the third lens group, and
f: a focal length of a whole lens system.

2. The imaging lens according to claim 1, satisfying following Conditional Equation:

$$0.1 < \beta 2 < 0.5 \quad (2)$$

$$1.0 < \beta 3 < 2.5 \quad (3)$$

wherein
β2: lateral magnification of the second lens group, and
β3: lateral magnification of the third lens group.

3. The imaging lens according to claim 1,
wherein the rear lens group includes a negative lens and a positive lens, and satisfies following Conditional Equation:

$$\nu 1Rp - \nu 1Rn > 25 \quad (4)$$

wherein
ν1Rp: Abbe number for "d" line of the positive lens of the rear lens group, and
ν1Rn: Abbe number for "d" line of the negative lens of the rear lens group.

4. The imaging lens according to claim 1,
wherein the third lens group includes a negative lens in which an absolute value of a curvature radius of an image surface side is smaller than that of the object side.

5. The imaging lens according to claim 1,
wherein the third lens group includes a negative lens, and satisfies following Conditional Equation:

$$1 < t3i/R3b < 4 \quad (5)$$

wherein
t3i: a length to an image surface from a surface apex of an image surface side of the negative lens of the third lens group, and
R3b: the curvature radius of the image surface side of the negative lens of the third lens group.

6. The imaging lens according to claim 1,
wherein the rear lens group is a cemented lens having a negative lens and a positive lens.

7. The imaging lens according to claim 1,
wherein the second lens group includes one positive lens.

8. The imaging lens according to claim 1,
wherein the diaphragm is arranged between the former lens group and the rear lens group of the first lens group.

9. An imaging apparatus comprising:
an imaging lens; and
an imaging device which outputs a photographing signal based on an optical image formed by the imaging lens,
wherein the imaging lens includes a first lens group, a second lens group having positive refractive power, a third lens group having negative refractive power, which are arranged in order from an object side,
wherein the first lens group includes a former lens group having a negative lens in a most object side, a diaphragm, and a rear lens group,
wherein, when focusing is performed, the second lens group is moved in an optical axis direction,
wherein the imaging lens satisfies the following Conditional Equation:

$$-2.0 < f3/f < -0.8 \quad (1),$$

wherein
f3: a focal length of the third lens group, and
f: a focal length of a whole lens system.

10. The imaging lens according to claim 9, satisfying following Conditional Equation:

$$0.1 < \beta 2 < 0.5 \quad (2)$$

$$1.0 < \beta 3 < 2.5 \quad (3)$$

wherein
β2: lateral magnification of the second lens group, and
β3: lateral magnification of the third lens group.

* * * * *